Patented Nov. 13, 1928.

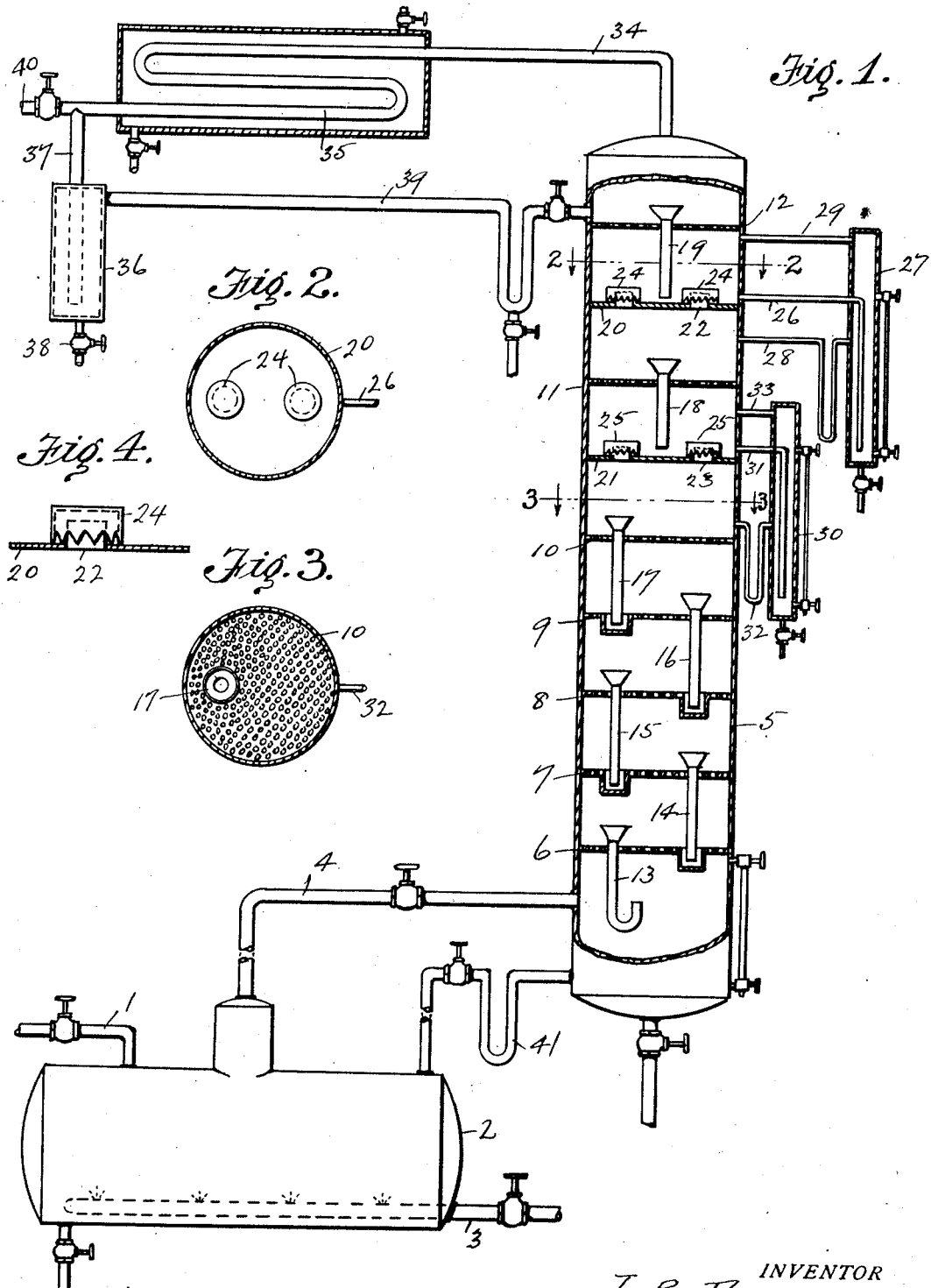

1,691,238

UNITED STATES PATENT OFFICE.

IRA B. FUNK, OF ALHAMBRA, CALIFORNIA, ASSIGNOR TO UNION OIL COMPANY OF CALIFORNIA, A CORPORATION OF CALIFORNIA.

PROCESS OF FRACTIONATING.

Application filed October 30, 1926. Serial No. 145,231.

My invention relates to improvements in fractionating vapors, together with suitable apparatus therefor.

The principal object of my invention is to provide a fractionating process and apparatus for separating desired fractions, or cuts, from the hydrocarbon vapors derived from an ordinary distillation process, a cracking process, or in the recovery of gasoline from a natural gas treating process, such as an absorption process.

Another object of my invention is to provide a closely cut product as regards its boiling points from a mixture of vaporous hydrocarbons which have been obtained by steam distillation.

Another object of my invention is to separate out water from the hydrocarbons in a fractionating column.

Another object of my invention is to provide a fractionating column having a plurality of water traps.

A further object of my invention is to provide a fractionating column having greater capacity than other fractionating columns of similar structure and dimensions.

Referring to the drawings in which the same numbers indicate like parts:

Fig. 1 is an elevation, partly in section, of an apparatus wherein my process may be practiced.

Fig. 2 is a transverse view, partly in section, across the lines 2—2 of Fig. 1.

Fig. 3 is a transverse view, partly in section, across the lines 3—3 of Fig. 1.

Fig. 4 is a detail of part of Fig. 1.

While my invention is applicable to all classes of treatments for petroleum products wherein steam, or water vapor, is used, I would particularly describe my process as applied to the separation of casinghead gasoline recovered from natural gas by means of an absorption system.

As is well known, natural gas is subjected to the influence of an absorption medium whereby certain fractions are absorbed and a mixture of fractions and absorption oil are passed through a line 1 into a still 2, which may be suitably heated in any well known manner for driving off the absorbed fractions.

Steam is introduced into still 2 by means of a line 3, whereby the well known effects of steam are utilized, and passes off with the vaporized desired fractions through a line 4 and enters a fractionating column 5.

The fractionating column 5 may be of a well known form of construction, including a plurality of perforated plates 6, 7, 8, 9, 10, 11 and 12, through which respectively pass funnels 13, 14, 15, 16, 17, 18 and 19 for passing reflux condensate back into the preceding and lower plates for dephlegmating the vapors as is well known.

In the upper part of column 5 I insert what I term "water plates" 20 and 21, having passages 22 and 23, respectively, therein covered by bubble caps 24 and 25, respectively, the use of which is well known.

Leading off from water plate 20, is a water line 26 passing into a water trap 27 and a line 28 for reflux returns from trap 27 to a point below said water plate 20, while a line 29 leads from the upper part of trap 27 back into the column above water plate 20 for returning vapors. A similar construction is arranged with a second trap 30 arranged to draw water and liquid off plate 21 through line 31 and return the reflux through a line 32 below water plate 21 and return vapors through a line 33 above the water plate 21.

It will be understood that fractionating column 5 may be constructed of as many perforated plates and water plates as are desired for the optimum operation in a particular fractionating process.

Vapors pass off from the upper part of column 5 through a line 34 where they are subjected to a condensing action in a suitably cooled condenser 35, the liquids therefrom passing to the lower part of water trap 36 through a line 37, the water being drawn off through a valve 38 and the reflux condensate being returned to the upper part of column 5 through a line 39. Uncondensed fractions from condenser 35 may pass through a line 40 for further condensing action and treatment as desired and undesired liquid fractions from fractionating column 5 pass from the lower part of column 5 through a line 41 to the still 2.

The process of fractionating casinghead gasoline may be carried on in the above manner whereby the product passing out of line 40 may have a desired range of boiling points and the same may be maintained according to the temperature and pressure of the process between still 2 and line 40, or any other hydrocarbon vapors may be fractionated to close cuts by the process.

I have operated the process under pressure as high as fifty (50) pounds per square inch, although an average use of pressure would not exceed forty (40) pounds per square inch.

I have been able to make close cuts and maintain the boiling points of products passing out of line 40, when using steam as an aid to distillation, by eliminating the partial pressure effects caused by the condensing and reboiling of water in column 5. This is accomplished by drawing off the condensed steam at the proper point in column 5, by means of one, or more, of the plurality of water separators 27 and 30 for drawing off such water from water plates 20 and 21.

Furthermore, I am enabled to increase the capacity of column 5 by arranging that the orifices in perforated plates 6 to 12, inclusive, become progressively smaller as the passage of the vapors takes place therethrough upwardly in column 5. This may readily be understood when it is explained that the water in the form of steam in column 5 from plates 6 to 10 will occupy a great deal more space than the same when it is condensed on water plates 21 and 20.

In the fractionation of hydrocarbon vapors, it is well understood that the passage of vapors through the perforated plates 6 to 10 and bubble caps 25, according to the temperature of column 5 and pressure therein, causes the progressive condensation of heavier fractions of the vapors in proportion as the vapors advance from the bottom to the top of column 5 and such condensates collect on the plates in the column to effect a washing action in a well known manner. There is a constant condensing and reboiling of fractions going on whereby ultimately only fractions having desired boiling points will pass out of line 34.

The water plates 20 and 21 are so arranged in column 5 that the condensed steam, together with reflux condensate, passes out of lines 26 and 31 into water traps 27 and 30, respectively, the water being drawn off at the lower part of each and the reflux being returned to the column through lines 28 and 32, respectively, any uncondensed vapors also being returned for further treatment through lines 29 and 33, respectively. By thus trapping out the water, I am enabled to maintain close cuts as to boiling points of products obtained through line 40 and furthermore, as described, the capacity of column 5 is greatly increased by varying the areas of the orifices therein according to the progress of vapors upwardly therethrough.

I claim:

1. Apparatus for rectification comprising means for distilling hydrocarbons to obtain the vapors therefrom, means to mix steam with the vapors, means to rectify the mixture, and a plurality of means to progressively withdraw condensed steam from the mixture at selected points in the rectifying means.

2. A process of rectification which comprises distilling liquid hydrocarbons with steam to obtain vapors therefrom, passing the mixture through a rectifying column wherein heavier undesired fractions are progressively condensed, then progressively condensing lighter fractions together with steam, then removing said lighter fractions and condensed steam at a plurality of selected points as condensed during said progression, separating the condensed steam from each portion removed, and returning the fractions to lower points in said column.

3. A process of rectification which comprises distilling liquid hydrocarbons with steam to obtain vapors therefrom, passing the mixture through a rectifying column wherein certain fractions are progressively condensed together with the steam, then removing said fractions and condensed steam at a plurality of selected points as condensed during such progression, and returning the said fractions to the column.

4. In a method of distilling petroleum oils with steam, the steps of passing the mixed petroleum vapors and steam through a rectifying column, progressively condensing the steam at a plurality of points in said column, removing said condensed steam and accompanying condensed vapor fractions adjacent the points of condensation, separating the condensed steam from the condensed petroleum fractions, and returning the condensed fractions to the rectifying column.

5. A method according to claim 4 wherein the fractions returned to the column are returned to points respectively slightly below the points from which they are removed.

6. A method for rectifying petroleum oils which comprises distilling said oils with steam, passing the mixed petroleum vapors and steam through a rectifying column, condensing the steam in said column, removing said condensed steam and accompanying condensed petroleum fractions from the column at a point adjacent the zone of condensation of said steam, separating the condensed steam and returning the condensed petroleum fractions to the column.

7. A process according to claim 6 wherein the returned fractions are returned to the column at a point somewhat below the point of their removal.

8. A method for rectifying petroleum oils which comprises distilling said oils with steam, passing the mixed petroleum vapors and steam through a rectifying column, condensing said steam in an upper part of said column forming a body of water in said column intimately contacting vapors with said body, and continually removing all of the condensed steam from the column, whereby substantially no water is returned to the lower part of the column.

9. A method according to claim 8 wherein the condensed steam is removed from a location adjacent the zone of condensation.

10. A method of rectifying petroleum oils which comprises distilling said oils with steam, passing the mixed vapors and steam to a rectifying column where the vapors and steam are progressively condensed at progressively decreasing temperatures in counter-current contact with condensate formed from said vapors and steam and the condensate is partially revaporized at a higher temperature zone in said column, and removing all the condensed steam at a point intermediate the zone of condensation and the zone of revaporization of said steam.

11. A method of rectifying petroleum oils which comprises distilling said oils with steam, passing the mixed vapors and steam to a rectifying column where the vapors and steam are progressively condensed at progressively decreasing temperatures in counter-current contact with condensate formed from said vapors and steam and the condensate is partially revaporized at a higher temperature zone in said column, and removing all the condensed steam at a point such as to eliminate the re-boiling of condensed steam in said column.

12. Apparatus for rectifying petroleum oils comprising means for distilling said oils with steam, a rectifying column adapted to receive the mixed petroleum vapors and steam, said column containing a plurality of superimposed plates and being constructed to condense steam, and lead-off means from certain of said plates to remove the condensed steam and attending condensed petroleum fractions, trap means connected with said lead-off means to separate the water, means to drain off such water, and means to return condensed petroleum fractions from the trap means to the column.

13. Apparatus for rectifying petroleum oils comprising means for distilling the same with steam, a rectifying column adapted to receive the mixed petroleum vapors and steam and containing a plurality of superimposed plates, lead-off lines from certain of said plates to remove water and attending condensed petroleum fractions, a trap connected with each of said lead-off lines, a water drain from each trap, and a return line from each trap for condensed petroleum fractions, each return line leading to a plate below the plate from which the respective fractions were withdrawn.

Signed at Los Angeles, in the county of Los Angeles and State of California, this 23rd day of October A. D. 1926.

IRA B. FUNK.